US011175607B2

(12) United States Patent
Chick et al.

(10) Patent No.: US 11,175,607 B2
(45) Date of Patent: Nov. 16, 2021

(54) PRINT PARTICLE OUTPUT ASSEMBLY

(71) Applicant: HEWLETT-PACKARD DEVELOPMENT COMPANY, L.P., Spring, TX (US)

(72) Inventors: Andy Philip Chick, Vancouver, WA (US); Pratik Pravinkumar Shah, San Diego, CA (US); Min-Chul Lee, Pangyo (KR); Ji-won Moon, Pangyo (KR); Matthew James Storey, Austin, TX (US); Zackary Thomas Hickman, Austin, TX (US); Corbett Benjamin Schoenfelt, Austin, TX (US); Bennett Alexander Nadeau, Austin, TX (US); Jefferson Blake West, Austin, TX (US)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 0 days.

(21) Appl. No.: 17/050,140

(22) PCT Filed: Aug. 30, 2018

(86) PCT No.: PCT/US2018/048816
§ 371 (c)(1),
(2) Date: Oct. 23, 2020

(87) PCT Pub. No.: WO2020/046332
PCT Pub. Date: Mar. 5, 2020

(65) Prior Publication Data
US 2021/0232063 A1    Jul. 29, 2021

(51) Int. Cl.
*G03G 15/08* (2006.01)
*B33Y 30/00* (2015.01)

(52) U.S. Cl.
CPC ..... *G03G 15/0886* (2013.01); *G03G 15/0865* (2013.01); *B33Y 30/00* (2014.12); *G03G 2215/066* (2013.01)

(58) Field of Classification Search
CPC ........... G03G 15/0865; G03G 15/0886; G03G 21/1676; G03G 2215/066;
(Continued)

(56) References Cited

U.S. PATENT DOCUMENTS 5,652,944 A * 7/1997 Masuda ........................ 399/24
5,655,180 A   8/1997 Yasuda et al.
(Continued)

FOREIGN PATENT DOCUMENTS

EP    0412459 A2   2/1991
EP    1103865      5/2001
(Continued)

*Primary Examiner* — Sophia S Chen
(74) *Attorney, Agent, or Firm* — Staas & Halsey, LLP

(57) ABSTRACT

Examples of an output assembly for a print particle replenishment device are described herein. Some examples of the output assembly include a sliding member. For example, the sliding member includes a channel that is offset from a rotating axis of the output assembly and a notch that is offset from the rotating axis and that extends to an outer edge of the sliding member. Some examples of the output assembly include a cover member to maintain a static position with respect to a rotation of the sliding member. In some examples, the cover member includes an alignment structure that is offset from the rotating axis of the output assembly.

21 Claims, 5 Drawing Sheets

(58) Field of Classification Search
CPC .......... G03G 2215/0692; B41J 2/17503; B41J 2/1752; B33Y 30/00
See application file for complete search history.

(56) References Cited

U.S. PATENT DOCUMENTS

| | | | |
|---|---|---|---|
| 5,848,338 A * | 12/1998 | Okada | 399/262 |
| 6,270,182 B1 | 8/2001 | Silverbrook et al. | |
| 6,332,065 B1 * | 12/2001 | Howard | G03G 15/0867 141/364 |
| 7,010,250 B1 * | 3/2006 | Yahagi | 399/258 |
| 7,672,621 B2 | 3/2010 | Sato | |
| 8,503,915 B2 | 8/2013 | Kimura et al. | |
| 8,554,117 B2 | 10/2013 | Okuda et al. | |
| 9,217,955 B2 | 12/2015 | Leemhuis et al. | |
| 2002/0064401 A1 * | 5/2002 | Ashikari | 399/258 |
| 2014/0227008 A1 * | 8/2014 | Janssen | G03G 15/0886 399/258 |
| 2018/0164717 A1 | 6/2018 | Acosta et al. | |

FOREIGN PATENT DOCUMENTS

| | | |
|---|---|---|
| EP | 1293843 | 3/2003 |
| JP | 08305148 A | 11/1996 |
| JP | 4242667 B2 | 3/2009 |

\* cited by examiner

PRINT PARTICLE OUTPUT ASSEMBLY

BACKGROUND

Some types of printing utilize print particles, such as print toner or powder. For example, three-dimensional (3D) printing may utilize one or more kinds of print particles. In some examples of 3D printing, 3D solid parts may be produced from a digital model using an additive printing process. 3D printing may be used in rapid prototyping, mold generation, mold master generation, and short-run manufacturing. Some 3D-printing techniques are considered additive processes because they involve the application of successive layers of build material. In some 3D-printing techniques, the build material may be cured or fused. Laser jet printing may utilize print toner. For example, a printer may cause toner particles to be fused to a piece of paper.

DETAILED DESCRIPTION

Figure 1:
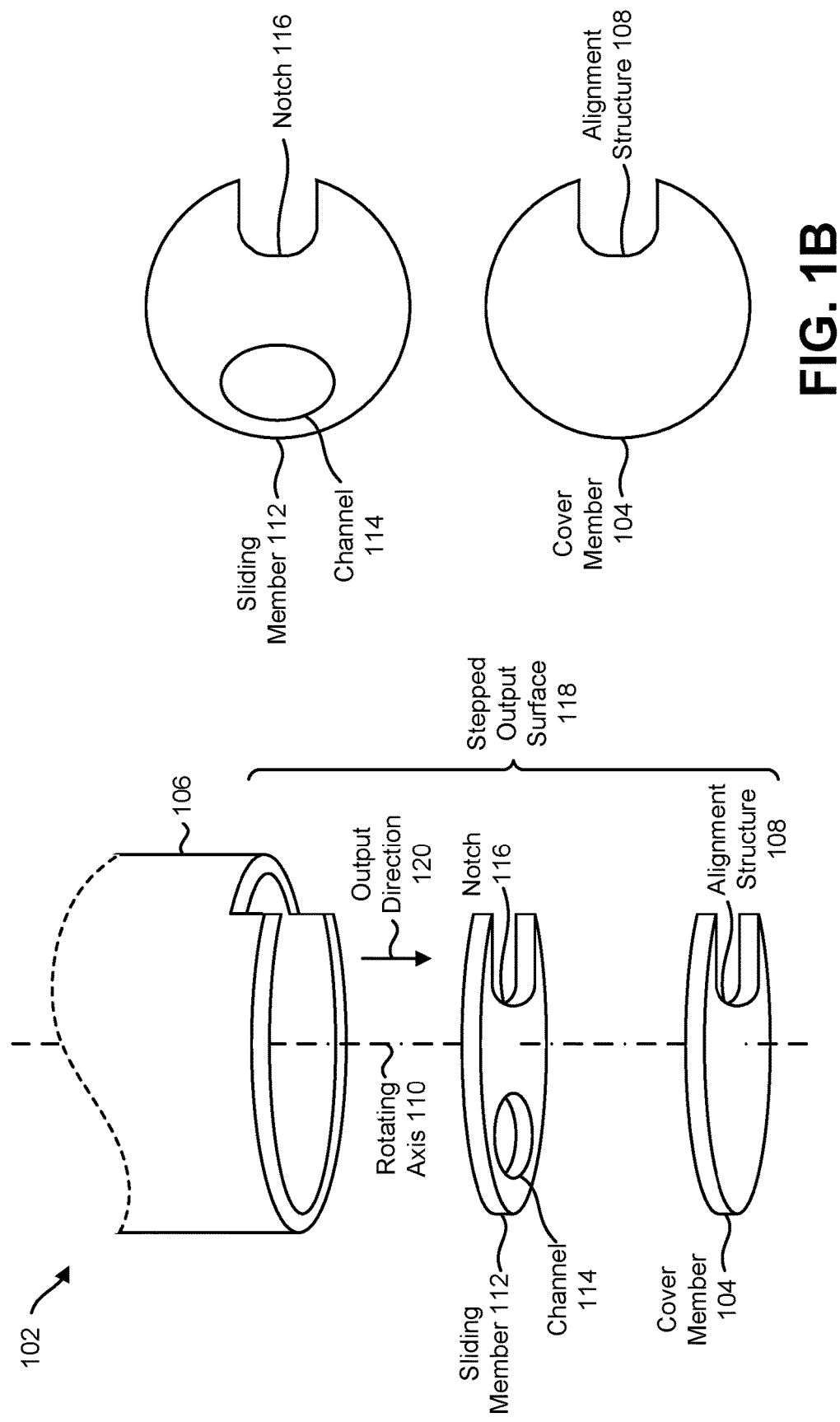
FIG. 1A is an exploded perspective view of an example of an output assembly.
FIG. 1B is a top elevational view of an example of a sliding member and a cover member.

Some printing technologies utilize print particles. Examples of print particles include three-dimensional (3D) print powder and toner. In some examples, an average diameter of 3D print powder particles of this disclosure may be less than 50 microns and/or an average diameter of toner particles of this disclosure may be less than 20 microns. It should be noted that in some examples, some print particles may be round, approximately round, or non-round. Print particles may become airborne and contaminate the environment if not controlled. Control may be difficult when print particle bottles are supplied to inexperienced users in environments like offices or homes (e.g., home offices). Flow characteristics of particles may be harder to predict than, for example, fluids. As can be observed from this discussion, devices and techniques that enable cleaner and simpler transfer of print particles may be beneficial.

Ensuring transfer of authentic print particles may also be beneficial. For example, preventing the use of print particles that perform worse or that are incompatible with a printer may be beneficial.

Throughout the drawings, identical reference numbers designate similar, but not necessarily identical, elements. The figures are not necessarily to scale, and the size of some parts may be exaggerated to more clearly illustrate the example shown. Moreover the drawings provide examples and/or implementations consistent with the description; however, the description is not limited to the examples and/or implementations provided in the drawings.

FIG. 1A is an exploded perspective view of an example of an output assembly 102. In some examples, the output assembly 102 may be part of a print particle replenishment device. A print particle replenishment device may be a container that holds print particles for donation (e.g., transfer or delivery) to a host device (e.g., print cartridge and/or printer). Examples of the print particle replenishment device include containers and bottles. The print particle replenishment device may contain and/or transfer print particles. For example, the print particle replenishment device may be designed to interface with a host device. A host device is a device that uses and/or applies print particles. Examples of a host device include printers and print cartridges. For example, it may be beneficial to replenish or refill a printer and/or print cartridge with print particles. For instance, a host device may have a useful life beyond use of a reservoir of print particles. Accordingly, it may be beneficial to replenish the reservoir in a host device with print particles rather than replacing the host device.

In some examples, the output assembly 102 may be a portion of a print particle replenishment device that is adapted to transfer print particles and/or deliver print particles to a host device from a storage portion (e.g., reservoir) of the print particle replenishment device. For example, the output assembly 102 may interface with a host device (e.g., a receptacle of a host device).

The output assembly 102 may be implemented in a variety of shapes. In the example of FIG. 1A, the output assembly 102 is cylindrical in shape. While the example of the output assembly 102 illustrated in FIG. 1A is cylindrical, the output assembly 102 may be shaped differently in other examples. For example, the cover member 104 may be square, rectangular, prismatic, triangular, irregularly shaped, or variations thereof (e.g., approximately square, etc.). As used herein, the term "cylindrical" may mean approximate conformity to a cylinder shape. For example, a cylindrical output assembly may include one or more portions that conform to or approximate a cylinder shape. For instance, a cylindrical output assembly may include one or more outer curved sections and/or an approximately circular end or base, while another end may or may not be circular.

The output assembly 102 may include a cover member 104. The cover member 104 may protrude (e.g., protrude downward) from an assembly wall 106, may be situated flush with the end of the assembly wall 106, or may be situated at a distance within the assembly wall 106. In some examples, the cover member 104 may be disposed perpendicular to a rotating axis 110 of the output assembly 102. The rotating axis 110 may or may not be a central axis of the output assembly 102.

In some examples, the cover member 104 may include an alignment structure 108 that is offset from the rotating axis 110 (e.g., central axis) of the output assembly 102. In some examples, the cover member 104 may be adapted to maintain a static position with respect to a rotation of a print particle replenishment device about the rotating axis 110. In some examples, the cover member 104 may be adapted to maintain a static position with respect to a rotation of a sliding member 112. In some examples, the alignment structure 108 may engage a structure (e.g., port) of a host device. For example, the structure (e.g., port) may fit within the alignment structure 108. For example, the cover member 104 may engage with a protruding host device port when in a connected undocked position. In some examples, the structure may hold the cover member 104 in a static position during rotation of the output assembly 102.

In some examples, the alignment structure 108 is a notch that extends to an outer edge of the cover member 104 to engage a receiving structure of a host device. In some examples, the alignment structure 108 is a hole (e.g., circular hole, square hole, rectangular hole, irregularly shaped hole, etc.) into which the receiving structure of a host device may fit. For example, the alignment structure 108 may be a circular hole into which a circular receiving structure (e.g., port) may fit.

The cover member 104 may be implemented in a variety of shapes. In the example of FIG. 1A, the cover member 104 is a cover disk with a circular or cylindrical shape. While the example of the cover member 104 illustrated in FIG. 1A is circular or cylindrical, the cover member 104 may be shaped differently in other examples. For example, the cover member 104 may be square, rectangular, prismatic, triangular, irregularly shaped, or variations thereof (e.g., approximately square, etc.).

The output assembly 102 may include a sliding member 112. In some examples, the sliding member 112 may be situated within the assembly wall 106. In some examples, the sliding member 112 may be disposed perpendicular to the rotating axis 110 of the output assembly 102. In some examples, the sliding member 112 may be disposed above the cover member 104. In some examples, the sliding member 112 may be in contact with the cover member 104.

In some examples, the sliding member 112 may include a notch 116 that is offset from the rotating axis 110. In some examples, the sliding member 112 may include a channel 114 that is offset from the rotating axis 110 (e.g., central axis). The channel 114 may be located at an angular displacement from or in an opposite direction from the notch 116. In some examples, the sliding member 112 may be adapted to shear relative to the cover member 104 during rotation of the print particle replenishment device. For example, as the output assembly 102 rotates, the sliding member 112 may rotate with the output assembly 102, while the cover disk maintains a static position. In some examples, the notch 116 may engage a port cover of a host device. For example, at engagement, the port cover may be coplanar with the sliding member 112. As the sliding member 112 rotates, the notch 116 may rotate the port cover. The rotation of the sliding member 112 may align the channel 114 with the alignment structure 108 of the cover member 104. In some examples, the cover member 104 may cover the channel 114 until the channel 114 is rotated to overlap with a receiving structure (e.g., port) of a host device. In some examples, a structure (e.g., port) of the host device may be situated within the alignment structure 108. Accordingly, the channel 114 may be rotated into alignment with the structure (e.g., port). In some examples, the structure (e.g., port) may abut the sliding member 112 during a least a portion of a rotation. Accordingly, the sliding member 112 may slide or shear relative to the structure (e.g., port). For example, the sliding member 112 (e.g., interior disk) may engage with a host device port cover and rotate the host device port cover to uncover a protruding host device port when in a docked position. In some examples, the sliding member 112 (e.g., interior disk) may have a same thickness as the host device port cover.

The sliding member 112 may be implemented in a variety of shapes. In the example of FIG. 1A, the sliding member 112 is a disk (e.g., an interior disk disposed in the interior of the assembly wall 106). While the example of the sliding member 112 illustrated in FIG. 1A is circular or cylindrical, the sliding member 112 may be shaped differently in other examples. For example, the cover member 104 may be square, rectangular, prismatic, triangular, irregularly shaped, or variations thereof (e.g., approximately square, etc.).

In some examples, the output assembly 102 may include an exterior locking structure (not illustrated in FIG. 1A). The exterior locking structure may be adapted to prevent removal of the output assembly 102 when the output assembly 102 is rotated. For example, the assembly wall 106 may include a protruding structure. The protruding structure may rotate with the output assembly 102 (e.g., assembly wall 106) to engage with a keeping structure (e.g., slide under a lip) of a host device receptacle.

In some examples, the output assembly 102 may include a stepped output surface 118. The stepped output surface 118 may be stepped along a print particle output direction 120. For example, the stepped output surface 118 may include multiple surfaces or layers. A first surface (e.g., higher surface) may be disposed relatively upstream. The first surface may be adapted to align to an input opening of a host device. The sliding member 112 may include or be an example of the first surface. For instance, the lower surface of the sliding member 112 may be an example of the first surface.

A second surface (e.g., lower surface) may be disposed away from a reservoir (e.g., print particle reservoir). The second surface may be adapted to align next to the input opening. The cover member 104 may include or be an example of the second surface. For instance, the upper surface of the cover member 104 may be an example of the second surface.

The output assembly 102 may be adapted so that in a closed condition, both the second surface and the first surface are closed. For example, the channel 114 of the sliding member 112 may be covered by the cover member 104 when in the closed condition. The cover member 104 may also be closed in the closed condition in that channel 114 is not aligned with the alignment structure 108 when in a closed condition. The output assembly 102 may be adapted so that in an open condition, the first surface includes an opening (e.g., channel 114).

In some examples, the output assembly 102 includes a sliding portion. The sliding member 112 may be an example of the sliding portion. The sliding portion may move from a first location along the first surface to a second location along the first surface, along a plane perpendicular to the output direction 120. For example, the channel 114 may move from a first location to a second position (e.g., rotated 180 degrees and/or translated by a distance). Moving the sliding portion from the first location to the second location may expose an open channel 114 from the reservoir to an input opening (of a host device, for example), through the second surface. It should be noted that in some examples, the sliding surface may move in a translating fashion instead of in a rotating fashion. For example, a sliding surface may shift such that a channel aligns with an input opening.

In some examples, the output assembly 102 may include integrated circuitry (not illustrated in FIG. 1A). For example, the output assembly 102 may include integrated circuitry for performing one or more authentication functions and/or dispense detection functions. In some examples, the output assembly 102 may include integrated circuitry that includes one or more contact pads disposed at the assembly wall 106 (e.g., a side wall of the output assembly). The contact pad(s) may be utilized to send one or more authentication signals and/or dispense detection signals to a host device. In some examples, the integrated circuitry may include a memory device for storing authentication data and/or dispense data. In some examples, the integrated circuitry (e.g., a portion of the integrated circuitry) may be disposed on the protruding structure (e.g., exterior locking structure).

In some examples, one or more of the features (e.g., structures, portions, planes, disks, covers, members, etc.) described herein may relate to the output direction 110 (e.g., may be perpendicular to the output direction 110, may be parallel to the output direction 110, may rotate with respect to the output direction 110, etc.) instead of a central axis or rotating axis. In some examples, the output direction 110 may be a general direction of print particle flow. In some examples, the general direction of print particle flow may be generally in the direction of gravity when the output assembly 102 is in a docked position. For example, the output assembly 102 may be oriented vertically with respect to gravity when docked. In other examples, the output assembly 102 may be oriented in different orientations.

FIG. 1B is a top elevational view of an example of the sliding member 112 and the cover member 104. As described in connection with FIG. 1A, the sliding member 112 may include a notch 116 and a channel 114. The cover member 104 may include an alignment structure 108.

In some examples, the sliding member 112 may include one or more components. For example, the sliding member 112 may include a wiping material. In some examples, the sliding member 112 may include a first layer (e.g., rigid layer, hard plastic layer, etc.) and a second layer (e.g., wiping material, wiping layer, absorbent layer, felt layer, cloth layer, rubber layer, etc.). The wiping material (e.g., second layer) may function to clean (e.g., absorb, adhere to, move, etc.) print particles.

In some examples, the cover member 104 may include one or more components. For example, the cover member 104 may include a wiping material. In some examples, the cover member 104 may include a first layer (e.g., rigid layer, hard plastic layer, etc.) and a second layer (e.g., wiping material, wiping layer, absorbent layer, felt layer, cloth layer, rubber layer, etc.). The wiping material (e.g., second layer) may function to clean (e.g., absorb, adhere to, move, etc.) print particles. In some examples, the wiping material (e.g., second layer) of the sliding member 112 and the wiping material (e.g., second layer) of the cover member 104 may be situated adjacent one another.

Figure 2:
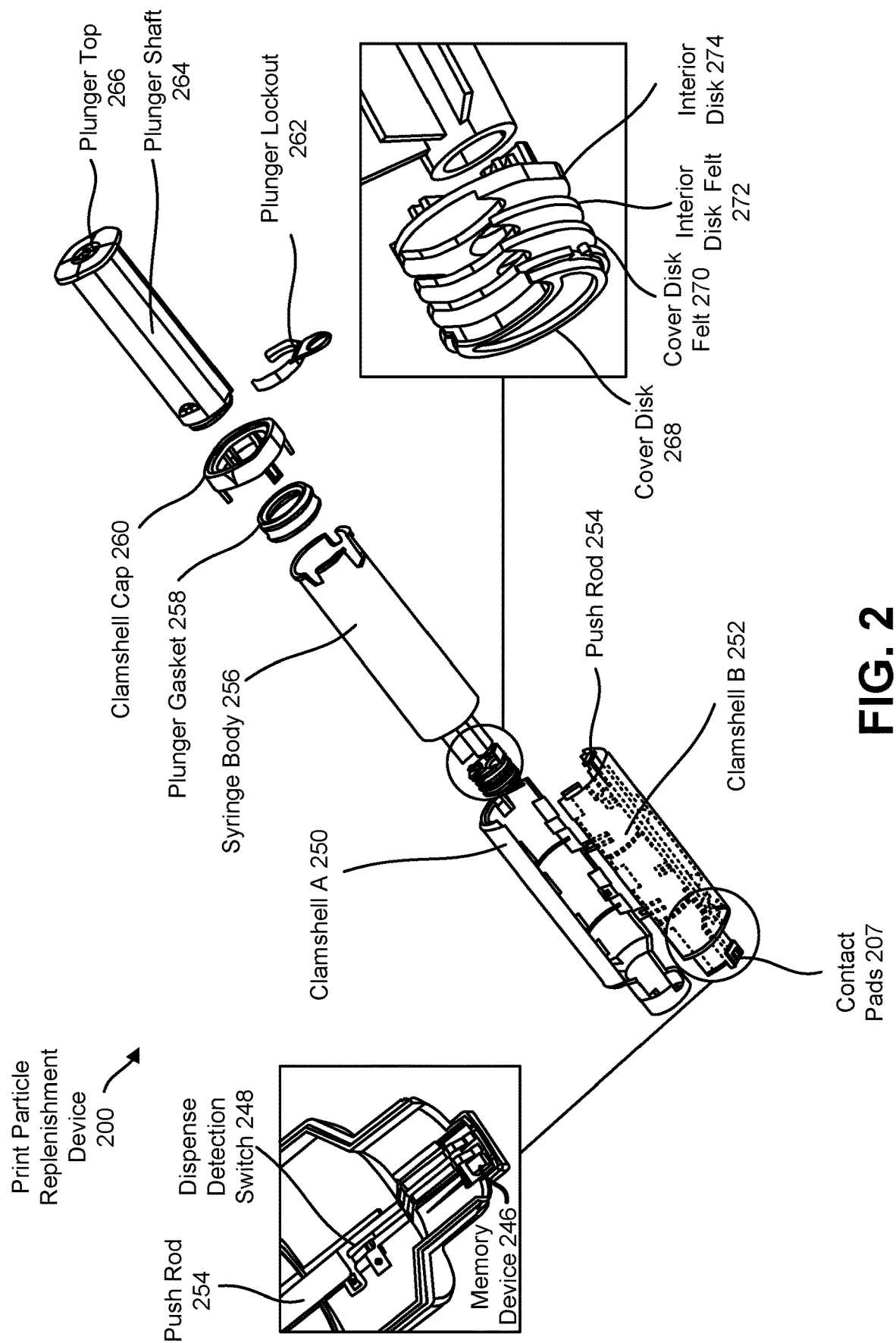
FIG. 2 is an exploded perspective diagram illustrating an example of a print particle replenishment device.

FIG. 2 is an exploded perspective diagram illustrating an example of a print particle replenishment device 200. The print particle replenishment device 200 illustrated in FIG. 2 may be an example of the print particle replenishment device described in connection with FIG. 1. FIG. 2 provides a zoomed in view of a portion of clamshell B 252 from an interior perspective. FIG. 2 also provides a zoomed in view of a valve stack (cover disk 268 and interior disk 274) from a different perspective.

In this example, the print particle replenishment device 200 includes clamshell A 250 (e.g., a clamshell with a tip), clamshell B 252, a syringe body 256, a plunger gasket 258, a clamshell cap 260, a plunger lockout 262 (e.g., packaging to be removed for replenishment, for example), and a plunger (including a plunger shaft 264 and a plunger top 266). In this example, a memory device 246 is included in clamshell B 252. In some examples, the memory device 246 may be implemented in Electrically Erasable Programmable Read-Only Memory (EEPROM). For example, the memory device 246 may be implemented as an EEPROM integrated circuit (e.g., chip or board). Other kinds of memory may be implemented in other examples. The memory device 246 may be coupled to contact pads 207. As described herein, the memory device 246 may store authentication data and/or dispense data. The contact pads 207 and/or memory device 246 may be examples of the integrated circuitry described in connection with FIG. 1A. In some examples, the contact pads 207 may be implemented as a circuit board (e.g., integrated circuitry, printed circuit board (PCB), etc.). In some examples, the circuit board may be insert molded into clamshell B 252. In some examples, an interior side of the circuit board may include the memory device 246 and/or one or more contact pads for a dispense detection mechanism. In some examples, the contact pads 207 may be disposed on a protruding structure. The protruding structure may be adapted to function as an exterior locking structure.

In some examples, a dispense detection switch 248 and/or a push rod 254 may be implemented to detect when print particles are dispensed from the print particle replenishment device 200. For example, as the plunger is inserted and/or pressed into the print particle replenishment device 200 (e.g., into the syringe body 256), the plunger may actuate the push rod 254, which may close the dispense detection switch 248. The dispense detection switch 248 (e.g., two switch parts or leads) may be coupled to the contact pads 207 and/or memory device 246. For example, the interior of the circuit board may include contact pads for dispense detection leads. The dispense detection leads may engage the circuit board during assembly. In some examples, when the dispense detection switch 248 is closed, the memory device 246 may update the dispense data to indicate that the print particles have been dispensed. The memory device 246 may send a dispense indicator signal that indicates the dispense detection data via the contact pads 207. In some examples, the dispense detection may be performed independently of the memory device 246 and/or dispense detection data. For example, a host device may determine whether the dispense detection switch 248 is closed or open (e.g., whether a current flows through the dispense detection switch or not, whether a voltage indicates closure of the dispense detection switch, etc,). The switch state may accordingly provide the dispense indicator signal. Examples of the dispense indicator signal may include an indicator of dispense data (from a memory device) and/or a current or voltage resulting from the state of a dispense detection mechanism (e.g., switch, contacts, etc.). A host device may receive the dispense indicator signal.

In some examples, the host device may utilize the dispense indicator signal to perform one or more functions. For example, if the print particle replenishment device 200 is engaged but not docked, the host device may unlock the host device receptacle to allow docking and delivery of print particles if the dispense indicator signal indicates that the print particles have not been dispensed. In another example, if the print particle replenishment device 200 is engaged but not docked and the dispense indicator signal indicates that the print particles have been dispensed, the host device may not unlock the host device receptacle for docking.

In some examples, the memory device 246 may send an authentication signal (e.g., indicating the authentication data) via the contact pads 207. A host device may receive the authentication signal. The host device may unlock the host device receptacle for docking and delivery of print particles if the authentication signal (e.g., authentication data) passes a check. Otherwise, the host device may not unlock the host device receptacle.

In some examples, the host device may utilize a combination of the dispense indicator signal and the authentication signal to determine whether to unlock the host device receptacle. For example, at engagement, the host device may unlock the host device receptacle if the dispense indicator signal indicates that the print particles have not been dispensed and if the authentication signal passes a check. Otherwise, the host device may not unlock the host device receptacle to avoid unauthorized replenishment.

In the example illustrated in FIG. 2, the print particle replenishment device 200 includes a cover disk 268, cover disk felt 270, interior disk felt 272, and an interior disk 274. The cover disk 268 and cover disk felt 270 may be an example of the cover member 104 described in connection with FIGS. 1A and 1B. The interior disk felt 272 and the interior disk 274 may be an example of the sliding member 112 described in connection with FIGS. 1A and 1B.

Figure 3B:
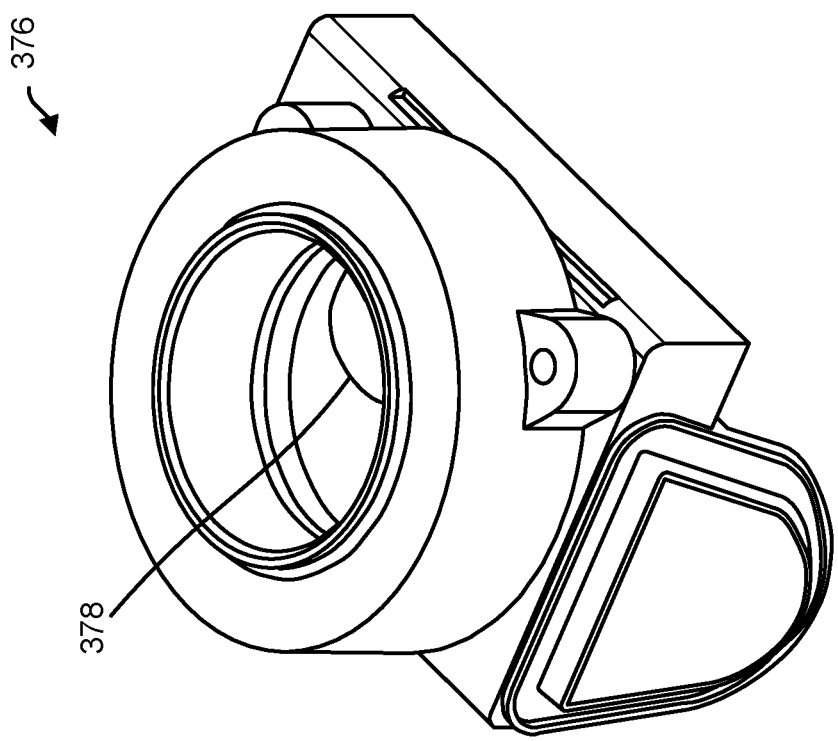
FIG. 3B is a perspective view of an example of a host device receptacle.
Figure 3A:
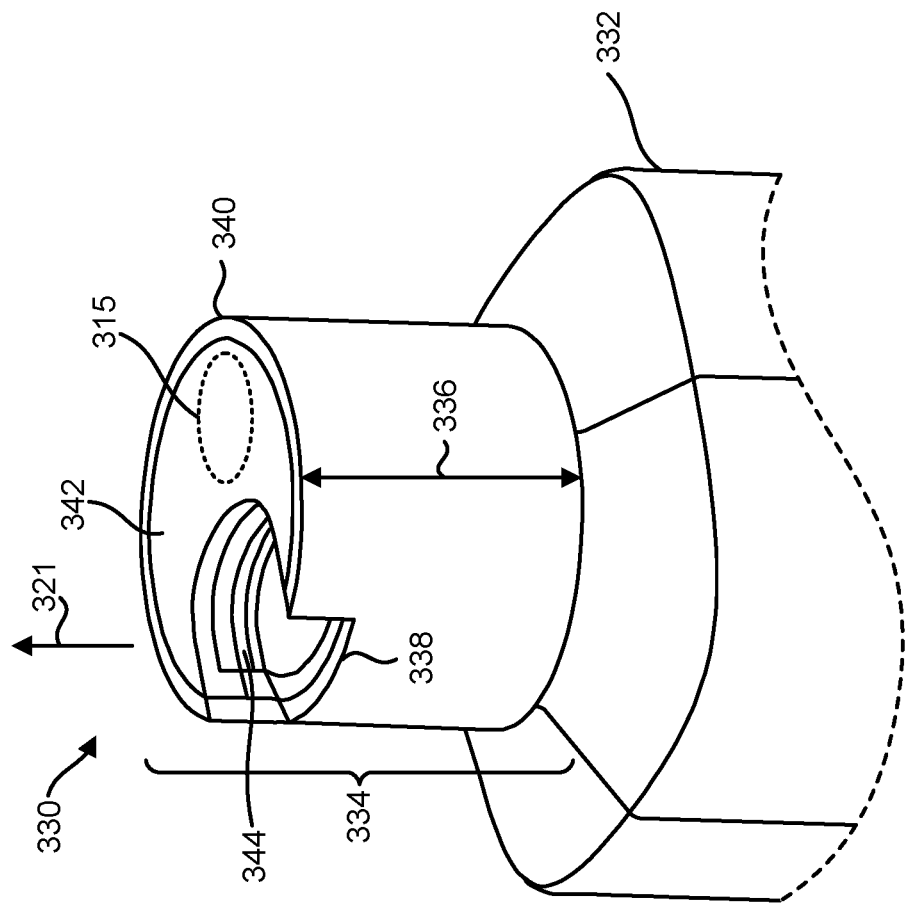
FIG. 3A is a perspective view of an example of a print particle donor container.

FIG. 3A is a perspective view of an example of a print particle donor container 330. The print particle donor container 330 may be an example of the print particle replenishment device described in connection with FIG. 1A. The print particle donor container 330 may include a bulk print particle reservoir 332. The bulk print particle reservoir 332 may store print particles for donation (e.g., transfer, delivery, etc.) to a host device. Another example of a bulk print particle reservoir is the syringe body 256 described in connection with FIG. 2.

In this example, the print particle donor container 330 includes an output neck 334. The output neck 334 may be an example of the output assembly 102 described in connection with FIG. 1A. In some examples, the output neck 334 may be narrower (e.g., smaller in a dimension, width, diameter, and/or radius) than the remainder of the print particle donor container or a bulk print particle reservoir. A "cylindrical output neck" may be an example of the output neck 334 that is cylindrical in shape. Although the output neck 334 is illustrated as having a smaller dimension (e.g., width, diameter, radius, etc.) than the remainder of the print particle donor container (e.g., the bulk print particle reservoir 332), the output neck 334 may have a smaller dimension, a same dimension, or a larger dimension than a remainder of the print particle donor container 330. The output neck 334 may include a protruding portion 336, a cutout 338, and/or a neck wall 340. The protruding portion 336 may be a portion of the output neck 334 that protrudes from a body (e.g., bulk print particle reservoir 332) of the print particle donor container 330. The cutout 338 may be a space of the output neck 334 for (e.g., to receive, to house, to fit, etc.) a counterpart structure of a host device (e.g., a port cover and/or port of a print particle and/or host device receptacle). In some examples, the cutout 338 may be a space of an otherwise uniform, symmetrical, or intact structure. For example, the cutout 338 in the example illustrated in FIG. 3A is a space in an otherwise cylindrical structure. The neck wall 340 may be a wall or shell portion of the output neck 334. The output neck 334 (e.g., protruding portion 336, cutout 338, and/or neck wall 340) may fit a print particle host device receptacle.

The output neck 334 may be adapted so that at least a part of the protruding portion 336 moves towards the cutout 338 relative to a static portion of the output neck 334. In some examples, an end 342 of the output neck 334 may be the static portion. For example, the static portion may be disposed at an end 342 of the output neck 334 within the neck wall 340. In some examples, the end 342 may remain static while at least a portion of the output neck 334 moves towards the cutout 338. For example, at least a part of the protruding portion 336 may move in a plane perpendicular to a print particle output flow direction 321 when turning the print particle donor container 330. At least a part of the protruding portion 336 may move a cover of a host device receptacle input opening to allow print particles to flow into an input opening. In some examples, the neck wall 340 may move with respect to the static portion. For example, the neck wall may move with respect to the static portion to move the cover of the input opening.

In some examples, the protruding portion 336 may be adapted to seat in the host device receptacle at connection to the host device receptacle. For example, at least a part of the protruding portion 336 may seat within a counterpart receptacle of a host device. The protruding portion 336 may include the neck wall 340. Accordingly, at least a part of the neck wall 340 may seat in the host device receptacle in some examples.

In some examples, a channel portion 344 may be at least a part of the protruding portion 336. The channel portion 344 (or a portion thereof) may move towards the cutout 338. In some examples, the channel portion 344 includes an output channel 315. In some examples, the output channel 315 may be located on an interior surface when in a closed position. The output channel 315 may be connected to a reservoir (e.g., bulk print particle reservoir 332). The output channel 315 may be adapted to align with the input opening of the host device. For example, the output channel 315 may move towards the cutout 338. For example, the output channel 315 may be exposed in the cutout 338 when moved towards the cutout 338. In some examples, the neck wall 340 may turn with respect to the static portion (e.g., an end 342 of the output neck 334). In some examples, the channel portion 344 may move a cover for opening an input opening of the host device. For example, the channel portion 344 may engage the cover and rotate the cover off of the input opening. In some examples, the cover may trade locations (e.g., angular location) with the output channel 315 when the print particle donor container 330 is rotated (e.g., rotated 180 degrees). It should be noted that although 180 degrees is provided as an example, a different amount of rotation (e.g., 90 degrees, 50 degrees, 120 degrees, etc.) may be utilized to align the output channel 315 with an input opening in other examples.

FIG. 3B is a perspective view of an example of a host device receptacle 376. In FIG. 3B, the host device receptacle 376 is in a closed position. In this example, the host device receptacle 376 includes an input (e.g., port) cover 378. When in the closed position, the input cover 378 covers an input opening or port. The output neck 334 or a portion thereof may be inserted into the host device receptacle 376. The input cover 378 may fit within the cutout 338. As the print particle donor container 330 is rotated, a portion (e.g., channel portion 344) may move the input cover 378 to uncover or open the host device input (e.g., port).

Figure 4A:
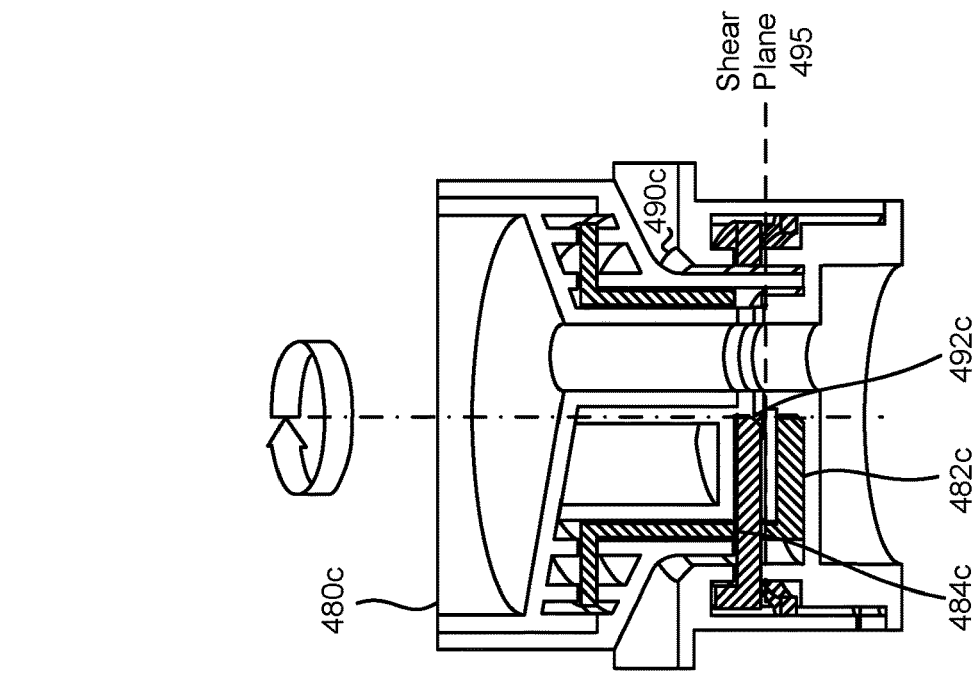
FIG. 4A is a cross-sectional elevation view of an example of an output assembly and a host device receptacle.

FIG. 4A is a cross-sectional elevation view of an example of an output assembly 480a and a host device receptacle 490a. In the example illustrated in FIG. 4A, the output assembly 480a includes a sliding member 486, a cover member 482a, and a nozzle 488. In this example, the sliding member 486 includes a felt layer and the cover member 482a includes a felt layer. The output assembly 480a may be an example of the output assembly 102 described in connection with FIG. 1.

In the example illustrated in FIG. 4A, the host device receptacle 490a includes a port cover 492a and a protruding input port 494a. In the example illustrated in FIG. 4A, the output assembly 480a is in a closed state. In a closed state, the cover member 482a may cover the channel of the sliding member 486. In this example, the output assembly 480a is also in a disconnected state relative to the host device receptacle 490a.

In the example illustrated in FIG. 4A, the cover member 482a includes a slot 484a (e.g., a semicircular slot). The slot 484a may be adapted to receive the port cover 492a when the port cover 492a is rotated (in a docked state, for example). For example, the slot 484a may be adapted to prevent removal of the output assembly 480a when the output assembly 480a is rotated (e.g., docked).

Figure 4B:
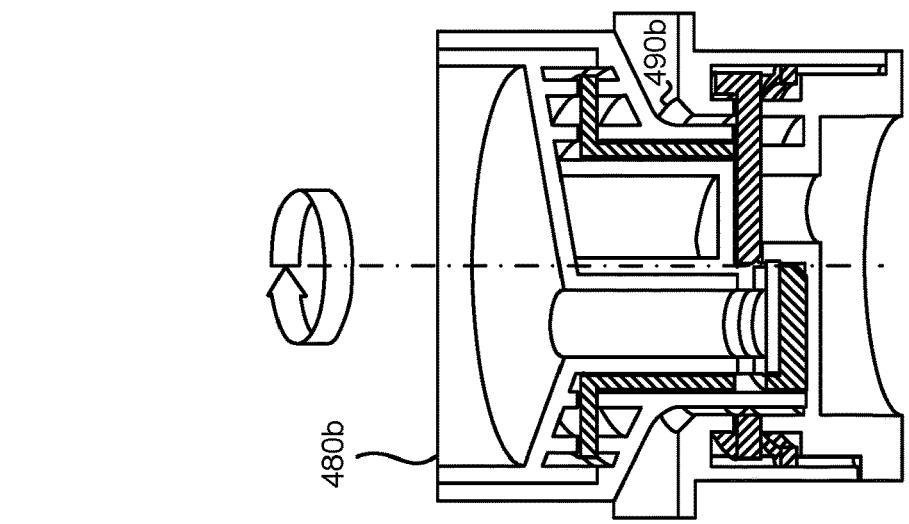
FIG. 4B is a cross-sectional elevation view of an example of the output assembly and the host device receptacle in a connected undocked state.

FIG. 4B is a cross-sectional elevation view of an example of the output assembly 480b and the host device receptacle 490b in a connected undocked state. As can be observed in FIG. 4B, the output assembly 480b has been inserted into the host device receptacle 490b. In this example, the output assembly 480b is in contact with the host device receptacle 490b, but has not yet been rotated.

Figure 4C:
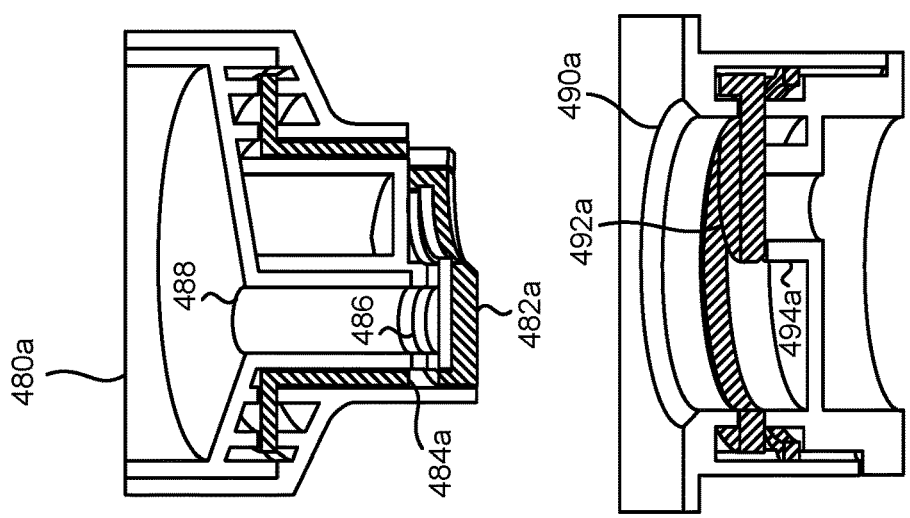
FIG. 4C is a cross-sectional elevation view of an example of the output assembly and the host device receptacle in a docked state.

FIG. 4C is a cross-sectional elevation view of an example of the output assembly 480c and the host device receptacle 490c in a docked state. As can be observed in FIG. 4C, the output assembly 480b has been inserted into the host device receptacle 490b and rotated. In this example, the cover member 482c has remained static while the sliding member has rotated with the port cover 492c, aligning the output assembly 480c nozzle and channel with the input port of the host device, which may allow print particles to be transferred or delivered from the output assembly 480c to the host device receptacle 490c. In some examples, the channel may shear with respect to the protruding input port. In some examples, the port cover 492c may shear with respect to the cover member 482c. For example, the shearing between the output assembly 480c and the host device receptacle 490c may occur along a shear plane 495.

In the example illustrated in FIG. 4C, the port cover 492c has moved into the slot 484c. This is one example of a locking mechanism (e.g., interior locking mechanism) to prevent removal of the output assembly 480c when the output assembly 480c is rotated (e.g., docked).

In some examples, the output assembly 480c (e.g., valve) does not expose the output (e.g., channel, nozzle) or host device port input to the user. During docking/undocking the channel may swap places with the port cover 492c. This may put the output (e.g., channel) port in direct contact with each other, end-to-end. The shear plane 495 may prevent residual print particles (e.g., powder, toner) from falling out of the output assembly 480c during removal by allowing the port to cleanly shear the channel between felt wiping layers.

Figure 5:
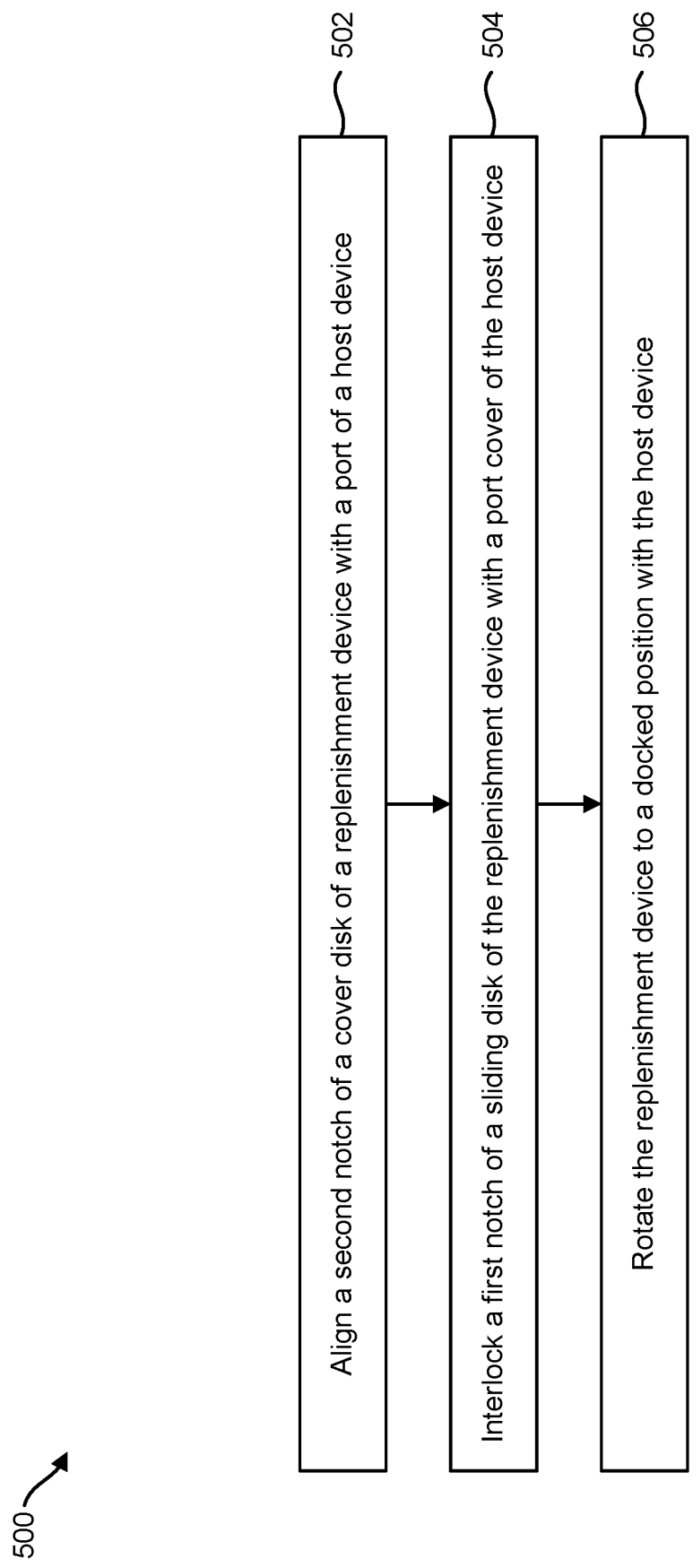
FIG. 5 is a flow diagram illustrating an example of a method for delivering print particles.

FIG. 5 is a flow diagram illustrating an example of a method 500 for delivering print particles. The method 500 may be performed by and/or with one or more of the output assemblies 102, 480a-c, print particle replenishment devices 200, print particle donor containers 330, and/or output necks 334 described herein.

A second notch of a cover disk of a replenishment device may be aligned 502 with a port of a host device. For example, the second notch of the cover disk may be engaged on a protruding port.

A first notch of a sliding disk of the replenishment device may be interlocked 504 with a port cover of the host device. For example, the first notch of the sliding disk may be engaged with a port cover of the host device. In some examples, the sliding disk may be situated in a plane with the port cover. The first notch may extend to an outer edge of the sliding disk. For example, having the first notch extend to the out edge may enable the first notch to be in a same plane as the host device port cover. Aligning 502 the second notch and interlocking 504 the first notch may be performed with the replenishment device (and/or host device receptacle) in an undocked position.

The replenishment device may be rotated 506 to a docked position with the host device. For example, the replenishment device may be rotated 506 through a range of rotation (e.g., 15 degrees, 45 degrees, 90 degrees, 120 degrees, 180 degrees, etc.) relative to the host device receptacle. The sliding disk may rotate the port cover and/or may slide over the port to align an offset output opening of the sliding disk with the port. In some examples, the offset output opening (e.g., channel) of the sliding disk may slide over the cover disk and the port during the rotation.

In some examples, the method 500 may include pushing a syringe plunger into the replenishment device to deliver print particles through the offset output opening (e.g., channel) and the port when in a docked position. In some examples, other techniques and/or structures may be utilized to deliver the print particles. For example, a screw structure may be implemented in the replenishment device, where twisting the screw structure drives the print particles out of the replenishment device. In another example, a pump mechanism may be implemented to push the print particles out of the replenishment device. In yet another example, delivery of print particles may be accomplished by gravity.

What is claimed is:

1. An output assembly for a print particle replenishment device, comprising:
   a sliding member, wherein the sliding member comprises a channel that is offset from a rotating axis of the output assembly and a first notch that is offset from the rotating axis and that extends to an outer edge of the sliding member; and
   a cover member to maintain a static position with respect to a rotation of the sliding member, wherein the cover member comprises an alignment structure comprising a second notch that is offset from the rotating axis of the output assembly,
   when the print particle replenishment device is in an undocked position with a host device:
      the first notch to interlock with a port cover of a host device, and
      the second notch to align with the port of the host device.

2. The output assembly of claim 1, wherein the first notch is to engage the port cover of the host device, so that at engagement the port cover is coplanar with the sliding member.

3. The output assembly of claim 1, wherein the sliding member comprises a wiping material.

4. The output assembly of claim 1, wherein the cover member comprises a wiping material.

5. The output assembly of claim 1, wherein the second notch extends to an outer edge of the cover member to engage a receiving structure of a host device.

6. The output assembly of claim 1, wherein the cover member is to cover the channel until the channel is rotated to overlap with a receiving structure of a host device.

7. The output assembly of claim 1, wherein the sliding member is to shear with respect to the cover member and with respect to a receiving structure of a host device during rotation.

8. The output assembly of claim 1, wherein the cover member comprises a semicircular slot perpendicular to the rotating axis, the semicircular slot to prevent removal of the output assembly when the output assembly is rotated.

9. The output assembly of claim 1, further comprising an exterior locking structure to prevent removal of the output assembly when the output assembly is rotated.

10. A print particle output assembly to provide print particles to an input opening, comprising:
   integrated circuitry comprising contact pads at a side wall of the print particle output assembly;
   a stepped output surface, stepped along a print particle output direction, the stepped output surface comprising a first surface that is to align to the input opening and a second surface away from a reservoir that is to align next to the input opening, whereby the print particle output assembly is adapted so that in a closed condition, both the second surface and the first surface are closed, and so that in an open condition, the first surface includes an opening, wherein the second surface comprises a cover disk perpendicular to a central axis of the print particle output assembly, wherein the cover disk comprises a first notch offset from the central axis, the cover disk to maintain a static position during rotation of a print particle donor container about the central axis, and wherein the first surface comprises an interior disk perpendicular to the central axis, wherein the interior disk comprises a second notch offset from the central axis and a channel offset from the central axis to dispense print particles, the interior disk to shear relative to the cover disk during the rotation of the print particle donor container.

11. The print particle output assembly of claim 10, wherein the print particle output assembly of claim 10 is included in a print particle donor container, the print particle output assembly further comprising a sliding portion that moves from a first location along the first surface to a second location along the first surface, along a plane perpendicular to the print particle output direction, thereby exposing an open channel from the reservoir to the input opening through the second surface.

12. The print particle output assembly of claim 10, wherein the print particle output assembly is cylindrical.

13. The print particle output assembly of claim 10, the cover disk to engage with a protruding host device port when in a connected and undocked position, and the interior disk to engage with a host device port cover and rotate the host device port cover to uncover the protruding host device port in a docked position.

14. The print particle output assembly of claim 13, wherein the interior disk has a same thickness as the host device port cover.

15. A method, comprising:
   aligning a second notch of a cover disk of a replenishment device with a port of a host device and interlocking a first notch of a sliding disk of the replenishment device with a port cover of the host device in an undocked position, wherein the first notch extends to an outer edge of the sliding disk; and
   rotating the replenishment device to a docked position with the host device, wherein the sliding disk rotates the port cover and slides over the port to align an offset output opening of the sliding disk with the port.

16. The method of claim 15, further comprising sliding the offset output opening of the sliding disk over the cover disk and the port during the rotating.

17. The method of claim 15, further comprising pushing a syringe plunger into the replenishment device to deliver print particles through the offset output opening and the port when in the docked position.

18. A print particle donor container, comprising:
   a bulk print particle reservoir; and
   an output neck to output print particles and to fit to a print particle receptacle, wherein the output neck comprising:
      a protruding portion,
      a cutout to interlock with a cover of a receptacle input opening and to align with the receptacle input opening, and
      a neck wall,
   wherein the output neck is adapted so that at least a part of the protruding portion moves towards the cutout relative to a static portion of the output neck, in a plane perpendicular to a print particle output flow direction, when turning the print particle donor container, to move a cover of a receptacle input opening to allow print particles to flow into an input opening.

19. The print particle donor container of claim 18, wherein the protruding portion is to seat in the print particle receptacle at connection to the receptacle, the protruding portion includes the neck wall and a channel portion that turns with respect to the static portion to move the cover for opening the input opening.

20. The print particle donor container of claim 18, wherein the protruding portion further includes an output channel connected to the bulk print particle reservoir, to align to the input opening.

21. The print particle donor container of claim 18, wherein the static portion is disposed at an end of the output neck within the neck wall, and wherein the neck wall moves with respect to the static portion to move the cover of the input opening.

* * * * *